United States Patent
Hoekstra et al.

(10) Patent No.: US 10,017,628 B2
(45) Date of Patent: Jul. 10, 2018

(54) FLAME RETARDED THERMOPLASTIC MOULDING COMPOSITION

(71) Applicant: DSM IP ASSETS B.V., Heerlen (NL)

(72) Inventors: Johannes Hoekstra, Echt (NL); Pim Gerard Anton Janssen, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/904,255

(22) PCT Filed: Jul. 9, 2014

(86) PCT No.: PCT/EP2014/064692
§ 371 (c)(1),
(2) Date: Jan. 11, 2016

(87) PCT Pub. No.: WO2015/007589
PCT Pub. Date: Jan. 22, 2015

(65) Prior Publication Data
US 2016/0152800 A1    Jun. 2, 2016

(30) Foreign Application Priority Data

Jul. 17, 2013 (EP) .................... 13176782
Jul. 18, 2013 (EP) .................... 13176962

(51) Int. Cl.
C08K 3/00      (2018.01)
C08K 5/5313    (2006.01)
C08G 69/26     (2006.01)
C08L 77/06     (2006.01)
C08K 7/02      (2006.01)
C08K 3/013     (2018.01)

(52) U.S. Cl.
CPC ............ *C08K 5/5313* (2013.01); *C08G 69/26* (2013.01); *C08K 3/013* (2018.01); *C08K 7/02* (2013.01); *C08L 77/06* (2013.01)

(58) Field of Classification Search
None
See application file for complete search history.

(56) References Cited

U.S. PATENT DOCUMENTS

| | | | |
|---|---|---|---|
| 2009/0030124 A1 | 1/2009 | Yin | |
| 2010/0113656 A1* | 5/2010 | Saga | C08K 5/5313 524/126 |
| 2012/0083558 A1* | 4/2012 | Bayer | C08K 5/098 524/101 |
| 2013/0150525 A1 | 6/2013 | Rulkens | |

FOREIGN PATENT DOCUMENTS

| | | |
|---|---|---|
| CN | 101796138 | 8/2010 |
| CN | 102869700 | 1/2013 |
| EP | 2 410 020 | 1/2012 |
| WO | WO 2011/135018 | 11/2011 |

OTHER PUBLICATIONS

International Search Report for PCT/EP2014/064692, dated Aug. 25, 2014, 3 pages.
Written Opinion of the ISA for PCT/EP2014/064692, dated Aug. 25, 2014, 4 pages.

* cited by examiner

*Primary Examiner* — Ana L Woodward
(74) *Attorney, Agent, or Firm* — Nixon & Vanderhye P.C.

(57) ABSTRACT

The invention relates to a flame retarded thermoplastic moulding composition comprising (A) a polyamide (B) a flame retardant system comprising a metal salt of a phosphinic acid and/or a diphosphinic acid; and either (C) a fibrous reinforcing agent; or (D) an inorganic filler; or a combination of (C) and (D), wherein (A) consists primarily of a semi-crystalline semi-aromatic polyamide (A1) with a melting temperature of at least 310° C. and consisting of repeat units, predominantly derived from terephthalic acid and diamines selected from C2-C8 diamines and having a molar average number of carbon atoms of at most 7.

19 Claims, No Drawings

FLAME RETARDED THERMOPLASTIC MOULDING COMPOSITION

This application is the U.S. national phase of International Application No. PCT/EP2014/064692 filed 9 Jul. 2014, which designated the U.S. and claims priority to EP Patent Application Nos. 13176782.4 filed 17 Jul. 2013, and 13176962.2 filed 18 Jul. 2013, the entire contents of each of which are hereby incorporated by reference.

The present invention relates to a flame retarded thermoplastic moulding composition comprising a thermoplastic polyamide and a flame retardant system and more particular to a fibre reinforced halogen free flame retardant composition comprising a semi-crystalline semi-aromatic polyamide, a metal (di)phosphinate flame retardant and a fibrous reinforcing agent, as well as the preparation and processing thereof, and moulded and extruded articles made thereof.

Semi-crystalline semi-aromatic polyamides are of commercial interest for many applications because of the relative high melting temperature, in particular with a melting temperature above 300° C. or higher. Such polyamides are generally copolyamides obtained from diamine and dicarboxylic acid, wherein the dicarboxylic acid comprises terephthalic acid, or a combination of terephthalic acid with isophthalic acid or adipic acid or both. The diamine may also comprise a mixture of different diamines.

Flame retarded thermoplastic moulding compositions are widely used in the field of electrical and electronic components and applications. In this field there is a need for polymeric materials having good mechanical properties, with retention of such properties at high temperature, good dimensional stability, a high heat deflection temperature and good blister resistance during soldering processes with high surface temperatures, while the compositions are halogen free or flame retarded by a halogen free flame retardant system.

For such applications thermoplastic moulding compositions based on semi-crystalline semi-aromatic polyamides such as PA6T/66, PA6T/46, PA9T and PA10T, and copolyamides thereof, with melting temperatures in the range of 300-320° C. have been introduced in the market. As halogen free flame retardant phosphorous or phosphorous and nitrogen containing flame retardants are being used. However, the flame retardants in these applications are often a source of problems.

Halogen free flame retardant systems are widely available, including various N-containing and or P-containing compounds, however, halogen free flame retardants pose a problem because of their intrinsic limited thermal stability. Their use is restricted to polymers that can be processed below specific temperatures. Whereas melamine and melamine cyanurate are employed in lower melting polyamides, such as PA 6 and PA 66, higher melting polyamides require more stable flame retardants like melamine condensation products, polyphosphate compounds and metal salts of (di)phosphinic acid.

Nitrogen containing flame retardants are limited in their use, because of outgassing and mould deposit as a result of the high temperatures applied during preparation and processing of the compounds.

Phosphorous containing flame retardants, in particular metal (di)phosphinate flame retardants, show in general less outgassing and mould deposit than nitrogen containing flame retardants at the same processing conditions, but present corrosion problems, which can lead to damage on polymer processing equipment. However, it has been observed that applying higher processing temperatures, also compositions comprising metal (di)phosphinate flame retardants, give increased outgassing and weight loss due to degradation of flame retardant. Fibre reinforced halogen free flame retardant compositions comprising a semi-crystalline semi-aromatic polyamide with a melting temperature of 305-325° C., a metal (di)phosphinate flame retardant and a fibrous reinforcing agent show outgassing problems when processed during compounding or moulding at temperatures of around 340° C. and above. Outgassing leads to mould deposits and vent blocking and results in reduced capacity due to increased frequency of cleaning cycles. This problem not only limits the use of such compositions, but also the development of compositions with even better high temperature properties.

There is a need for flame retarded thermoplastic moulding compositions that have even better thermal properties.

The aim of the present invention is therefore, to provide a flame retarded thermoplastic moulding composition comprising a thermoplastic polyamide, a flame retardant system and a fibrous reinforcing agent, that has good mechanical properties and good high temperature properties, while showing improved outgassing behaviour.

This aim has been achieved with the composition according to the invention, comprising
(A) a polyamide;
(B) a flame retardant system comprising a metal salt of a phosphinic acid and/or a diphosphinic acid (B1); and either
(C) a fibrous reinforcing agent; or
(D) an inorganic filler; or
  a combination of (C) and (D)
wherein polyamide (A) consists of 60-100 wt. % of a semi-crystalline semi-aromatic polyamide (A1) and 0-40 wt. % of another thermoplastic polyamide (A2) as mentioned in claim 1.

The effect of the composition according to the invention, comprising a semi-crystalline semi-aromatic polyamide with the prescribed composition of repeat units in combination with a metal(di)phosphinate flame retardant and a fibrous reinforcing agent, is that the composition has improved outgassing properties, i.e. shows less outgassing at the same temperature, or can be processed at higher temperatures, while retaining a low outgassing, comparable to that of other polyamides compositions comprising a semi-crystalline semi-aromatic polyamide, a metal(di)phosphinate flame retardant and a fibrous reinforcing agent processed at lower temperature. Meanwhile, the inventive composition has good mechanical properties and good high temperature properties.

The semi-crystalline semi-aromatic polyamide (A1) in the composition according to the invention consists of repeat units derived from:
  aromatic dicarboxylic acid consisting of:
    80-100 mole % terephthalic acid; and
    0-20 mole % of another aromatic dicarboxylic acid,
    the mole % being relative to the total molar amount of aromatic dicarboxylic acid;
  diamines consisting of
    35-95 mole % of a first diamine selected from linear aliphatic C2-C8 diamines;
    5-65 mole % of a second diamine selected from C2-C8 diamines which is different from the first diamine; and
    0-40 mole % of at least one other diamine;
    the mole % being relative to the total molar amount of diamine, wherein the diamines have a molar average number of carbon atoms of at most 7;

0-5 mole % of components other than aromatic dicarboxylic acid and diamine, relative to the total molar amount of aromatic dicarboxylic acid, diamine and other components in polyamide (A1).

The semi-crystalline semi-aromatic polyamide (A1) consists of repeat units predominantly derived from aromatic dicarboxylic acid(s) and diamines. The aromatic dicarboxylic acid comprises primarily terephthalic acid. The other aromatic dicarboxylic acid that may be comprised in the repeat units is suitably selected from isophthalic acid, naphthalene dicarboxylic acid and 4,4'-biphenyl dicarboxylic acid, and any combination thereof. The amount thereof is suitably at most 10 mole % and the amount of terephthalic acid at least 90 mole %. The aromatic dicarboxylic acid may eventually even fully consist of terephthalic acid.

The molar average number of carbon atoms for the diamines is a molar average value (N) calculated with formula (I):

$$N=(\Sigma_{k=1}^{n} Mk*Pk)/(\Sigma_{k=1}^{n} Mk) \qquad (I)$$

Herein the molar fraction (M) of each of the diamines in the polyamide is multiplied by the number of carbon atoms (P) in the corresponding diamine, and the sum of multiplications ($\Sigma M*P$) is divided by the total of molar fractions of the diamines.

The diamines in the semi-crystalline semi-aromatic polyamide (A1) comprise at least two C2-C8 diamines. A C2-C8 diamine is herein understood to be a diamine with a number of carbon atoms P, P being an integer in the range from 2 up to and including 8. The first diamine is a linear aliphatic C2-C8 diamine. The linear aliphatic C2-C8 diamine comprises either 2, 3 4, 5, 6, 7 or 8 carbon atoms, and can be selected from 1,2-ethylenediamine, 1,3-propylenediamine, 1,4-tetramethylenediamine (1,4-butanediamine), 1,5-pentamethylenediamine (1,5-pentanediamine), 1,6-hexamethylenediamine (1,6-hexanediamine), 1,7-heptamethylenediamine (1,7-heptanediamine) and 1,8-octamethylenediamine (1,8-octanediamine).

Preferably for good mechanical and high temperature properties the first diamine comprises an even number of carbon atoms, and more preferably is selected from 1,4-butane diamine and 1,6-hexanediamine, which are diamines with 4 respectively 6 carbon atoms.

The second C2-C8 diamine can also be a linear diamine, though different from the first diamine, and may be selected from the linear aliphatic C2-C8 diamine listed hereabove. The second C2-C8 diamine may also be a branched aliphatic diamine or a cycloaliphatic diamine. Suitable branched diamines include 2-methylpentamethylene diamine, 3,3'-dimethylpentamethylenediamine and 2-methyloctamethylene diamine. A suitable cycloaliphatic diamine is trans-1,4-cyclohexanediamine.

Examples of suitable polyamides for polyamide (A1) are PA 4T/6T, PA 4T/8T, PA6T/8T, PA 6T/DT and PA 4T/DT, and copolyamides thereof.

Preferably, the second diamine is a linear aliphatic C2-C8 diamine, more preferably a linear aliphatic C2-C8 diamine with an even number of carbon atoms.

Preferred combinations of the first and second diamine are 1,6-hexanediamine with 1,2-ethylenediamine, 1,4-butane diamine or 1,8-octanediamine, and 1,4-butane diamine with 1,8-octanediamine. Most preferred is the combination 1,6-hexanediamine with 1,4-butanediamine.

The polyamide (A1) may comprise repeat units derived from one or more other diamines, next to the first and second diamine. The other diamine may in principle be any other diamine, different from the first and second diamine, or any mixture of different diamines, as long as the molar average number of carbon atoms in the diamine as a whole is at most 7. This to allow for good mechanical and high temperature properties in combination with sufficient flame retardancy and low outgassing.

The other diamine suitably comprises one or more diamines selected from linear aliphatic diamines, branched aliphatic diamines, cycloaliphatic diamines and aryldialkylamines. The diamine is suitably selected from C2-C12 diamines. Diamines with more than 12 carbon atoms may be used as well, but typically in a lower maximum amount and/or in combination with a higher amount of a short chain diamine like 1,4-butane diamine.

Suitable linear aliphatic diamines include the linear aliphatic C2-C8 diamines mentioned above, as well as linear aliphatic diamines with nine or more carbon atoms. Suitably, the other diamine comprises a C9-C12 diamine selected from 1,9-nonamethylenediamine, 1,10-decamethylenediamine, 1,11-undecamethylenediamine, and 1,12-dodecanemethylenediamine. Suitable branched diamines include 2-methylpentamethylene diamine, 3,3'-dimethylpentamethylenediamine and 2-methyloctamethylene diamine. A suitable cycloaliphatic diamine is trans-1,4-cyclohexanediamine.

Examples of suitable polyamides for polyamide (A1) comprising a third diamine are PA 4T/6T/8T, PA 4T/6T/10T, PA 4T/8T/10T, PA6T/8T/10T, and PA 4T/6T/DT and copolyamides thereof, with the provision that the ratio of diamines therein is selected such that the molar average number of carbon atoms in the diamines is at most 7.

In a preferred embodiment, the amount of other diamine is in the range of 0-30 mole %, more preferably 0-20 mole %, for example in the range of 5-15 mole %, relative to the total molar amount of diamine.

In a preferred embodiment, the molar average number of carbon atoms in the diamines, N, as a whole is at most 6.75, more preferably at most 6.5, or even at most 6.25. This allows for a polyamide composition with a higher melting temperature, while still retaining a good outgassing performance.

Polyamide (A1) may comprise repeat units derived from other components, next to the said aromatic dicarboxylic acid and diamine. However, the amount thereof shall be limited and be at most 5 mole %, relative to the total molar amount of aromatic dicarboxylic acid, diamine and other components in polyamide (A1).

Such other repeat units may have been derived from a component selected from aliphatic dicarboxylic acids, α,ω-aminocarboxylic acids, lactams, mono-functional compounds and tri-or higher-functional compounds, or any combination thereof.

Preferably, the amount of other components in polyamide (A1) is in the range of 0-2.5 mole %, or even better 0-1.0 mole %, relative to the total molar amount of aromatic dicarboxylic acid, diamine and other components in polyamide (A1).

Polyamide component (A) in the composition according to the invention comprises primarily or even fully consists of the semi-crystalline semi-aromatic polyamide (A1). Next to polyamide (A1), polyamide (A) may comprise one or more other polyamides (together referred to as polyamide (A2)), such as a semi-crystalline semi-aromatic polyamide other than polyamide (A1), an amorphous semi-aromatic polyamide or an aliphatic polyamide, or any combination thereof, provided that the total amount of repeat units in polyamide (A1) and polyamide (A2) derived from components other than aromatic dicarboxylic acid and diamine is in the range of 0-5 mole % relative to the total molar amount of aromatic dicarboxylic acid, diamine and other components in polyamide (A1) and polyamide (A2). Whereas polyamide (A2) may be present in an amount of up to and including 40 wt. %, relative to the total weight of polyamide (A), the amount of polyamide (A2) shall be much lower if it comprises an aliphatic polyamide, to comply with the requirement for the other components.

Preferably, polyamide (A) consists of 70-100 wt. % polyamide (A1) and 0-30 wt. % polyamide (A2). More preferably, polyamide (A) comprises 0-25 wt. % polyamide (A2), and further consists of 75-100 wt. % polyamide (A1). Herein the wt. % are relative to the total weight of polyamide (A). More preferably, polyamide (A) comprises 0-20 wt. % polyamide (A2), and further consists of 80-100 wt. % polyamide (A1). Herein the wt. % are relative to the total weight of polyamide (A). Also preferably, the amount of aliphatic polyamide is at most 5 wt. %, more preferably 2.5 wt. % and even better at most 1.0 wt. % relative to the total weight of polyamide (A).

Also preferably, the amount of components other than aromatic dicarboxylic acid and diamine is in the range of 0-2.5 mole %, or even better 0-1.0 mole %, relative to the total molar amount of aromatic dicarboxylic acid, diamine and other components in polyamide (A1) and polyamide (A2).

Polyamide (A1) in the composition according to the invention has a melting temperature of at least 310° C.

With the term melting temperature is herein understood the peak temperature of the endothermic melting peak measured by DSC by the method according to ISO 11357-1/3 (2011) with a scan rate of 20° C./min in the second heating cycle.

The melting temperature may vary over a wide range and may be as high as for example 360° C. The composition may be processed for example at 370° C. Though outgassing increases with increasing temperature, the outgassing for the composition according to the invention remains lower than for other fibre reinforced flame retarded thermoplastic moulding composition comprising a thermoplastic polyamide and a halogen free flame retardant system processed at the same high temperature.

Preferably polyamide (A1) has a melting temperature of at least 320° C. and more preferably in the range of 325° C.-350° C. A higher minimum melting temperature results in better retention of mechanical properties at elevated temperature, whereas a lower maximum melting temperature allows for processing at lower temperature and for lower outgassing.

Suitably, polyamide (A1) has a glass transition temperature of at least 125° C., preferably at least 130° C. If present at all, polyamide (A2) suitably comprises an amorphous semi-aromatic polyamide with a glass transition temperature of at least 120° C., preferably at least 125° C. An advantage of the higher glass transition temperature is that the composition shows better retention of mechanical properties and better dimensional stability under humid conditions.

Suitably, polyamide (A) has a viscosity number (VN) of at least 50 ml/g, preferably at least 60 ml/g, more preferably at least 70 ml/g. An advantage of a higher VN is that moulded parts made of the composition have a better blistering resistance upon reflow soldering after conditioning under humid and elevated temperatures. The VN is herein measured in 96% sulphuric acid with a polymer concentration of 0.005 g/ml at 25° C. by the method according to ISO 307, fourth edition.

A semi-crystalline semi-aromatic polyamide with high content in XT and YT repeat units, and optionally ZT units, and high viscosity number and high melting temperature can be prepared by direct solid-state polymerization starting from a XT/YT salt, respectively a XT/YT/ZT salt. Herein X represents the first diamine, Y the second diamine, and Z a third diamine or a combination of diamines different from X and Y, and T represents terephthalic acid.

The composition according to the invention comprises a flame retardant system, which comprises at least a metal salt of a phosphinic acid and/or a diphosphinic acid, herein also indicated as metal (di)phosphinate or component (B1). Suitable metal salts of (di)phosphinic acids that can be used in the composition according to the present invention are, for example, a phosphinate of the formula (I), a disphosphinate of the formula (II),

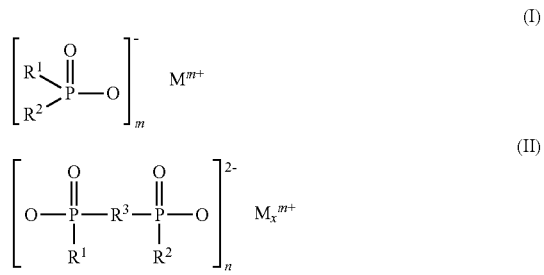

or polymers of these wherein $R^1$ and $R^2$ are identical or different or are $C_1$-$C_6$ alkyl, linear or branched, and/or aryl; $R^3$ is $C_1$-$C_{10}$-alkylene, linear or branched, $C_6$-$C_{10}$-arylene, -alkylarylene or -arylalkylene; M is one or more of calcium ions, magnesium ions, aluminium ions and zinc ions, m is 2 to 3; n is 1 or 3; x is 1 or 2. $R^1$ and $R^2$ may be identical or different and are preferably methyl, ethyl, n-propyl, isopropyl, n-butyl, tent-butyl, n-pentyl and/or phenyl. $R^3$ is preferably methylene, ethylene, n-propylene, isopropylene, n-butylene, tert-butylene, n-pentylene, n-octylene, n-dodecylene, or phenylene or naphthylene, or methylphenylene, ethylphenylene, tert-butylphenylene, methylnaphthylene, ethylnaphthylene or tert-butylnaphthylene, or phenylmethylene, phenylethylene, phenylpropylene or phenylbutylene. M is preferably aluminium ions or zinc ions. These compounds are disclosed in U.S. Pat. No. 6,255,371, which is hereby incorporated herein by reference.

Preferably the metal (di)phosphinate or component (B1) comprises an aluminium (di)phosphinate. Suitable examples thereof are aluminium methylethyl(di)phosphinate and/or aluminium diethyl(di)phosphinate.

Preferably, the amount of the metal (di)phosphinate comprised by the flame retardant polyamide composition is in the range of 2.5-25 wt. %, more preferably 5-20 wt. %, relative to the total weight of the composition.

The composition may comprise one or more flame retardants other than the metal (di)phosphinates, and/or one or more flame retardant synergists.

Flame retardant synergists that can be used in combination with metal (di)phosphinate flame retardants include S—, N—, P—, or O— containing metal compounds.

Examples of other flame retardants include magnesium oxide, aluminium oxide, zinc oxide, manganese oxide, tin oxide, aluminum hydroxide, böhmite, difydotalcite, hydrocalumit, magnesium hydroxide, calcium hydroxide, zinc, hydroxide, tin hydroxide, manganese hydroxide, zinc borate, basic zinc silicate and zinc stannate.

Preferred S—, N—, or O— containing metal compounds are metal borates, such as zinc borate and barium borate, or a metal stannate, such as zinc stannate. In another preferred embodiment the P-containing metal compounds are phosphorous acid salts, such as aluminium phosphite. These phosphorous acid salts are disclosed in WO2012/045414-A1, which is hereby incorporated herein by reference.

In a preferred embodiment, flame retardant system (B) consists of 65-100 wt. % of (B1) and 0-35 wt. % of at least one S—, N—, P—, or O— containing metal compound, or any combination thereof, the wt. % being relative to the total weight of (B). More preferably, the amount of the at least one S—, N—, P—, or O— containing metal compound, or any combination thereof, is in the range of 0-25 wt. %, relative to the total weight of (B).

The composition suitably has a flame retardancy, measured by the method according to UL 94 V, with a rating of V-2 at 0.8 mm, preferably with a rating of V-1 at 0.8 mm, more preferably V-0 at 0.8 mm. The composition suitably comprises the flame retardant system in an amount sufficient to comply with a V-2 rating, preferably an amount to comply with a V-1 rating and more preferably an amount to comply with a V-0 rating at 0.8 mm.

The composition further comprises a fibrous reinforcing agent and/or an inorganic filler. Examples of suitable fibrous reinforcing agents are glass fibres, including regular glass fibres and flat or non-spherical glass fibres, and carbon fibres. Examples of suitable fillers are glass flakes, kaolin, clay, talc, mica, wollastonite, calcium carbonate, silica, carbon fibres and potassium titanate, The fibrous reinforcing agent, if used at all, is suitably present in an amount in the range of, for example, 5-60 wt. %, preferably 10-55 wt. %, more preferably 20-50 wt. %, relative to the total weight of the composition.

The inorganic filler, if used at all, is suitably present in an amount in the range of, for example, 5-60 wt. %, preferably 20-50 wt. %, relative to the total weight of the composition.

In a preferred embodiment, the total amount of fibrous reinforcing agent and inorganic filler in the composition is in the range of 10-65 wt. %, preferably 20-55 wt. %, for example about 40 wt. % or about 50 wt. %. Such a high amount is preferred in case a high stiffness is required, such as for example, for use in housings for electronic devices such as for notebooks, mobile phones and PC tablets.

The polyamide composition of the present invention may optionally comprise further components. Suitably these are selected from auxiliary additives selected from, for example, acid scavengers, impact modifiers, plasticizers, stabilizers (such as, for example, thermal stabilizers, oxidative stabilizers, UV light stabilizers and chemical stabilizers), processing aids (such as, for example, mould release agents and nucleating agents), solid lubricants, colorants (such as carbon black, other pigments, dyes), nanoclays, etc.

Suitably, the composition has a HDT-A, measured according ISO 75-1/-2, of at least ° C. of at least 280° C., preferably at least 295° C. Suitably, the HDT is in the range of 295-330° C. Such a high HDT can be obtained by using a polyamide (A1) with a higher melting temperature, limiting the amount of other polyamide components polyamide (A2) and increasing the amount of fibrous reinforcing agent. Preferably, polyamide (A1) has a melting temperature of at least 320° C., more preferably at least 330° C.

Preferably, the amount of other polyamide (A2) is limited to at most 25 wt. %, preferably at most 20 wt. %, and in case of an aliphatic polyamide to at most 2.5 wt. %.

In a particular embodiment of the invention, the flame retardant polyamide composition consists of
(A) 30-91 wt. % of polyamide, consisting of 80-100 wt. % of polyamide (A1) and 0-25 wt. % polyamide (A2)
(B) 4-30 wt. % of a flame retardant system consisting for 65-100 wt. % of metal(di)phosphinate (B1)
(C)/(D) 5-60 wt. % of a combined amount of inorganic filler and/or fibrous reinforcing agent;
(E) 0-15 wt. % of other components In a preferred embodiment thereof, the flame retardant polyamide composition consists of
(A) 30-87 wt. % of polyamide, consisting of 95-100 wt. % of polyamide (A1) and 0-5 wt. % of polyamide (A2)
(B) 7.5-25 wt. % of a flame retardant system consisting for 65-100 wt. % of metal(di)phosphinate (B1)
(C)/(D) 10-60 wt. % of a combined amount of inorganic filler and/or fibrous reinforcing agent; including 10-50 wt. % of glass fibres
(E) 0-7.5 of other components Herein the weight percentages (wt. %) of (A)-(E) are relative to the total weight of the composition, and the sum of (A)-(E) is 100%.

The compositions according to the invention can be prepared by a process, wherein the semi-aromatic polyamide, the flame retardant system, inorganic filler and/or fibrous reinforcing agent and optional additional ingredients are melt-blended. Part of the materials including the polyamide may be mixed in a melt-mixer, and the remainder of the components may then be added later and further melt-mixed until a uniform composition. Melt-blending may be carried out using any appropriate method known to those skilled in the art. Suitable methods may include using a single or twin-screw extruder, a blender, kneader, Banbury mixer, moulding machine, etc.

The compositions of the present invention may be conveniently formed into a variety of articles using injection moulding, rotomoulding and other melt-processing techniques. The articles are useful in SMT applications among others and include connectors, such as memory cards, (CPU) sockets, I/O, FPC, SMT terminal blocks, RAST connectors, (high) power connectors, motherboard and automotive connectors, and housings and stiffener frames for electronic devices, for example housings and stiffener frames for notebooks, mobile phones, stiffeners PC tablets, relays, bobbins, (power) transformers, inverters etc.

The invention also relates to a process for the production of moulded parts from the flame retardant polyamide composition according to the invention, or any embodiment thereof, as described above, comprising a melt-processing step, wherein a composition according to any of above claims is heated to a temperature above the melting temperature of the polyamide to form a melt, followed by the shaping of the melt in a mould. The advantage is that products with good mechanical and thermal properties are obtained with relative low outgassing. Such a process may be carried, for example, by injection moulding in an injection moulding machine.

The invention also relates to a moulded or extruded article or product made from a composition according to the present invention, or any specific embodiment thereof. Suitably, the article is a plastic part of a connector or a housing or stiffener frame for an electronic device.

The invention is further illustrated with the following examples and comparative experiments.

EXPERIMENTAL PART

Test Methods
Viscosity Number (VN)

The VN was measured in 96% sulphuric acid with a polymer concentration of 0.005 g/ml at 25° C. by the method according to ISO 307, fourth edition.

Determination of Melting Temperature by DSC According to ISO-11357-113, (2011)

The measurements of the melting temperature (Tm) were carried out with a Mettler Toledo Star System (DSC) using a heating and cooling rate of 20° C./min in an N2 atmosphere. For the measurements a sample of about 5 mg pre-dried powdered polymer was used. The pre-drying was carried out at high vacuum, i.e. less than 50 mbar and at 105° C. during 16 hrs. The sample was heated from 0° C. to 380° C. with a heating rate of 20° C./min, immediately cooled to 0° C. with a cooling rate of 20° C./min and subsequently heated again at 20° C./min to about 30° C. above the melting temperature. For the melting temperature Tm the peak value of the melting peak in the second heating cycle was determined.

Glass Transition Temperature by DSC (According to ISO-11357-2 (2013)

The measurements of the glass transition temperature (Tg) were carried out with a Mettler Toledo Star System (DSC) using a heating and cooling rate of 20° C./min in an N2 atmosphere in the same way as described above for the Tm. Herein the Tg was determined as the temperature at the peak of the first derivative (with respect of time) of the parent thermal curve corresponding with the inflection point of the parent thermal curve for the second heating cycle Mechanical Properties Mechanical properties (tensile modulus [MPa], tensile strength [MPa], elongation at break [%]) were measured in a tensile test according to ISO 527-1/2:2012 with a drawing speed of 5 mm/min at a temperature of 23° C. For the tests test bars conforming 527-type-1A were used.

Heat Deflection Temperature (HDT-A)

The heat deflection temperature was measured according to ISO 75-1/-2, with a nominal stress of 1.80 Mpa applied (HDT-A).

Flame Retardancy

The flame retardancy was measured by the method according to UL-94-V.

Outgassing

Outgassing was simulated and measured using the following protocol: about 10 mg of cryogenically milled sample was inserted in a TGA machine. The sample was dried for 10 minutes at 90° C. in the TGA device. Subsequently the sample was heated to the isothermal temperature with a ramp rate of 40° C./minute, after which the isothermal weight loss was continuously followed for 60 minutes. Reported weight losses are compared to the sample's initial weight measured upon reaching the isothermal temperature.

Materials

Exolit OP 1230 Aluminium diialkylphosphinate flame retardant, ex Clariant.
Melam Flame retardant ex DSM
Melamine Polyphosphate Melapur 200, Flame retardant ex BASF
Zytel HTN FR52 G30 NH Polyamide composition based on PA 6T/66, Exolit OP1230 and glass fibres (about 30 wt. %), ex DuPont.
Genestar 9T GN2332 Polyamide composition based on PA 9T, Exolit OP1230 and glass fibres (about 30 wt. %), ex Kururay.
Vicnyl R630 NG Polyamide compositions based on PA10T, Exolit OP1230 and glass fibres (about 30 wt. %), ex Kingfa.
PA 6T/4T/66 PA 6T/4T/66 copolymer (ratio 51/34/15 mole %) with a melting temperature of 325° C., VN 80 ml/g.
Novamid X21 F07 PA 6I/6T (70/30 mole %) semi aromatic amorphous copolyamide, Tg 127° C., ex DSM.
CB-MB Carbon black master batch based on polyamide 6 (20/80 wt %).

Preparation PA 6T/4T (N=5.2)

A mixture of 1225 g of terephthalic acid was charged into a 10 liter baffled flask, attached to a rotary evaporator, equipped with a heated diamine dosing vessel was kept under an inert nitrogen atmosphere and mixed by rotation at 5 rpm. The rotating flask was partially submerged in a water bath, maintained at 60° C. to remove the heat of neutralization. A liquid mix of 528 g 1,6-hexane diamine and 286 g 1,4-butane diamine of 60° C. was added drop-wise to the acids in 4 hours under constant rotation. After dosing, the reaction mixture was stirred by rotation at a water batch temperature of 60° C. for another 30 minutes. After the experiment salt in the form of loose powder was obtained. The powder had a melting temperature of 280° C.

This recipe was repeated several times and the batches were mixed to obtain a homogeneous powder mixture.

A 50 liter tumble drier was charged with 10 kg of the salt. It was inertized by evacuation to 50 mbar and filling with nitrogen and repeating this 5 times. A nitrogen purge of 10 g/h was used. Then the mixture was heated in 2 hours to 200° C. and subsequently in 10 hours to 250° C., while allowing the reaction water to leave the tumble drier. Then the nitrogen stream was stopped and a mix of 130 g 1,6-hexane diamine and 60 g 1,4-butane diamine of 60° C. was added during 1 hour, while keeping the temperature at 250° C. The mix was reacted another 2 hours. Then a nitrogen stream of 1 kg N2/hour was applied and the material cooled to room temperature. 8.5 kg of a white powder was obtained with a VN of 85 ml/g, a molar average number of carbon atoms (N) of the diamines of 5.2 and a Tm of 338° C.

Compounding

Flame retardant glass fibre reinforced compositions were prepared by melt mixing on a Berstorff ZE25/48 UTX (a co-rotating twin-screw extruder) operating at 350 rpm and using a wall temperature setting of 350° C. All polymeric materials were fed to the feed-throat of the extruder and the glass and flame retardant were fed downstream on the melt. The settings used resulted in a temperature of the melt exiting the die-head of approximately 370° C. The mean residence time of the molten polymers in the extruder was about 30 seconds Moulding Samples were injection moulded into 527-1A and UL 94V specimen using an Engel 110 injection moulding machine equipped with a 25 mm screw. Temperature settings were chosen such that all samples were injected into the mould with a melt temperature of 350° C.

Compositions and test results for the various experiments are shown in Table 1.

TABLE 1

| | Experiment | | | | | | | | | | | |
|---|---|---|---|---|---|---|---|---|---|---|---|---|
| | CE-A | CE-B | CE-C | CE-D | CE-E | CE-F | CE-G | EX-I | EX-II | EX-III | EX-IV | EX-V |
| Composition | | | | | | | | | | | | |
| PA 6T/4T/66 | 70 | 58 | | | | | | | | | | |
| PA 6T/4T | | | | | | 58 | 58 | 66 | 62 | 58 | 56 | 37.3 |
| Novamid X21 F07 | | | | | | | | | | | | 18.7 |
| CB-MB | | | | | | | | | | | 2 | 2 |
| GF | 30 | 30 | | | | 30 | 30 | 30 | 30 | 30 | 30 | 30 |
| FR Exolit OP1230 | | 12 | | | | | | 4 | 8 | 12 | 12 | 12 |
| Melam | | | | | | 12 | | | | | | |
| Melamine Polyphosphate | | | | | | | 12 | | | | | |
| Zytel HTN FR52 G30 NH (PA 6T/66) | | | 100 | | | | | | | | | |
| Genestar 9T GN2332 (PA 9T) | | | | 100 | | | | | | | | |
| Vicnyl R630 NG (PA 10T) | | | | | 100 | | | | | | | |
| Molar average number (N) of carbon atoms in diamines in polyamide A1 | <6 | <6 | 6 | >>7 | >>7 | 5.2 | 5.2 | 5.2 | 5.2 | 5.2 | 5.2 | 5.2 |
| Physical properties | | | | | | | | | | | | |
| VN (ml/g) | 82.1 | 80.7 | | | | 82.5 | 67 | 83.5 | 84.1 | 84.7 | 86.7 | 79.2 |
| Tm (° C.) | 325 | 324 | 310 | 306 | 295 | 338 | 337 | 337 | 338 | 337 | 329 | 314 |
| Tg (° C.) | 123 | 125 | 90 | 125 | 110 | 151 | 151 | 151 | 152 | 151 | 145 | 133 |
| Mechanical properties | | | | | | | | | | | | |
| Modulus (MPa) | 11354 | 11324 | 10500 | 12000 | 9500 | 11400 | X | 11329 | 11300 | 11298 | 11215 | 11468 |
| Tensile Strength (MPa) | 151 | 161 | 150 | 165 | 140 | 140 | X | 176 | 180 | 172 | 190 | 193 |
| Elongation at break (%) | 1.63 | 2.11 | 2.2 | 3.8 | 2.7 | 1.93 | X | 2.01 | 2.3 | 2.38 | 2.63 | 2.48 |
| HDT-A (° C.) | 305 | 305 | 285 | 285 | 275 | 319 | X | 321 | 322 | 322 | 320 | 297 |
| Flame Retardancy | | | | | | | | | | | | |
| UL-94-rating at 0.8 mm | NC | V-1 | V-0 | V-0 | V-0 | V-2 | X | V-2 | V-1 | V-0 | V-0 | V-0 |
| Weight loss (%) | | | | | | | | | | | | |
| 10 minutes at 340° C. | 0.5 | 1.4 | 3.2 | 2.0 | 1.5 | 3.0 | X | 0.4 | 0.5 | 0.5 | 0.6 | 0.6 |
| 10 minutes at 350° C. | 0.8 | 2.2 | 4.9 | 3.2 | 2.2 | 4.5 | X | 0.7 | 0.8 | 0.8 | 1.0 | 1.0 |
| 10 minutes at 360° C. | 1.3 | 3.2 | 6.7 | 5.1 | 3.4 | 5.5 | X | 1.3 | 1.3 | 1.4 | 1.6 | 1.7 |

X = compounding already encountered severe problems and preparation of test bars by injection moulding was not possible.

The results in Table 1 show that the compositions according to the invention, comprising a different amount of flame retardant (Examples I-III), and comprising additionally a carbon black masterbatch in PA6 respectively an amorphous polyamide (Examples IV and V), show a very low outgassing, which is hardly affected by the amount of flame retardant present (Examples I-III). Even at a flame retardant content sufficient to achieve a UL94 V-0 rating, the outgassing is still much lower than the outgassing in the comparative experiments for other flame retarded semi-aromatic polyamide compositions, processed and tested at the same temperatures. The compositions of Examples I-III according to the invention can be processed at a higher processing temperature, while showing an outgassing level at a test temperature of 360° C. comparable to or even lower than the outgassing levels of Comparative Experiments B-E tested at a test temperature of 340° C.

Tests with other flame retardants, also used for other high temperature compositions, also revealed less good results. Comparative Experiment F Comparative Experiment G already showed severe problems during compounding and even more so during moulding, which prevented preparation of test bars needed for further testing.

All Examples I-V showed good reflow solderability without blistering in IPC/JEDEC J-STD-020B testing after moisture sensitivity level 1 pre-conditioning.

The invention claimed is:
1. A flame retarded thermoplastic moulding composition comprising:
   (A) a polyamide comprising a semi-crystalline semi-aromatic polyamide (A1);
   (B) a flame retardant system comprising a metal salt of a phosphinic acid and/or a metal salt of a diphosphinic acid (B1);
   and at least one of:
   (C) a fibrous reinforcing agent; and
   (D) an inorganic filler; wherein
   the semi-crystalline semi-aromatic polyamide (A1) has a melting temperature of at least 320° C. and consists of repeat units derived from:
      (i) aromatic dicarboxylic acid consisting of:
         80-100 mole % terephthalic acid; and
         0-20 mole % of another aromatic dicarboxylic acid, wherein
         the mole % is relative to the total molar amount of aromatic dicarboxylic acid;
      (ii) diamines having a molar average number of carbon atoms of at most 7 and consisting of:
         35-95 mole % of a first C4-C8 diamine,
         5-65 mole % of a second C4-C8 diamine, different from the first diamine
         0-40 mole % of one or more other diamines,
         the mole % being relative to the total molar amount of diamines in polyamide (A1); and
      (iii) 0-5 mole % of components other than the aromatic dicarboxylic acid and the diamines, relative to the total molar amount of the aromatic dicarboxylic acid, the diamines and other components in polyamide (A1); and wherein
   the polyamide (A) consists of:
      60-100 wt. % of polyamide (A1); and
      0-40 wt. % of another thermoplastic polyamide (A2) comprising repeat units derived from dicarboxylic acid and diamine, wherein the wt. % is relative to the total weight of polyamide (A); and wherein the total amount of repeat units in the polyamide (A1) and the polyamide (A2) derived from components other than aromatic dicarboxylic acid and diamine is in the range of 0-5 mole % relative to the total molar amount of aromatic dicarboxylic acid, diamine and other components in the polyamide (A1) and the polyamide (A2).

2. The composition according to claim 1, wherein the first and second diamine are linear aliphatic diamines.

3. The composition according to claim 1, wherein the first and/or second diamine is selected from 1,4-butanediamine and 1,6-hexanediamine.

4. The composition according to claim 1, wherein the other diamine is a third C4-C8 diamine or a linear C9-C12 diamine.

5. The composition according to claim 1, wherein the amount of other diamine is at most 30 mole %.

6. The composition according to claim 5, wherein the amount of other diamine is at most 20 mole %.

7. The composition according to claim 1, wherein the polyamide (A1) is at least one selected from the group consisting of polyamide-4T/6T (PA4T/6T), polyamide-4T/8T (PA4T/8T), polyamide-6T/8T (PA6T/8T), polyamide-6T/DT (PA6T/DT), and polyamide-4T/DT (PA4T/DT).

8. The composition according to claim 1, wherein the aromatic dicarboxylic acid comprises at least 90 mole % of terephthalic acid.

9. The composition according to claim 1, wherein the diamines in polyamide (A1) have a molar average number of carbon atoms of at most 6.75.

10. The composition according to claim 9, wherein the diamines in polyamide (A1) have a molar average number of carbon atoms of at most 6.5.

11. The composition according to claim 1, wherein the polyamide (A2) comprises at least one polyamide selected from the group consisting of:
an amorphous semi-aromatic polyamide,
a semi-crystalline semi-aromatic polyamide other than polyamide (A1), and
an aliphatic polyamide.

12. The composition according to claim 1, wherein the total amount of repeat units in the polyamide (A1) and the polyamide (A2) derived from other components is in the range of 0-2.5 mole %, relative to the total molar amount of aromatic dicarboxylic acid, diamine and other components in the polyamide (A1) and the polyamide (A2).

13. The composition according to claim 1, wherein the flame retardant system (B) consists of:
75-100 wt. % of the metal salt of a phosphinic acid and/or the metal salt of a diphosphinic acid (B1), and
0-35 wt. % of a flame retardant synergist consisting of at least one metal compound which is selected from the group consisting of metal borates, metal stannates, and phosphorous acid metal salts, and wherein
the wt. % is relative to the total weight of the flame retardant system (B).

14. The composition according to claim 1, wherein the composition has a heat deflection temperature (HDT-A) of at least 280° C. and/or a UL-94 rating V-0 at 0.8 mm.

15. The composition according to claim 1, wherein the composition consists of:
30-91 wt. % of the polyamide (A) consisting of 80-100 wt. % of the polyamide (A1) and 0-20 wt. % the polyamide (A2);
4-30 wt. % of the flame retardant system (B) consisting of 65-100 wt. % of a metal(di)phosphinate (B1);
a combined amount of 5-60 wt. % of the inorganic filler (C) and the fibrous reinforcing agent (D); and
0-15 wt. % of components (E) other than components (A)-(D), wherein
the wt. % is relative to the total weight of the composition and components (A)-(E) add up to 100 wt. %.

16. The composition according to claim 1, wherein the semi-crystalline semi-aromatic polyamide (A1) has a melting temperature of at least 330° C.

17. A process for preparing a moulded product comprising melt-processing the composition according to claim 1 by heating the composition to a temperature above the melting temperature of the polyamide to form a melt, followed by shaping the melt in a mould.

18. A moulded or extruded article which comprises the composition according to claim 1.

19. A flame retarded thermoplastic moulding composition comprising:
(A) 30-91 wt. %, based on total composition weight, of a polyamide comprising (A1) 60-100 wt. % of a polyamide-6T/4T (PA6T/4T) having a melting temperature of at least 320° C., and (A2) 0-40 wt. % of another thermoplastic polyamide comprised of repeat units derived from dicarboxylic acid and diamine, wherein the wt. % of (A1) and (A2) is relative to the total weight of the polyamide (A);
(B) 4-30 wt. %, based on total composition weight, of an aluminum dialkylphosphinate flame retardant; and
5-60 wt. %, based on total composition weight, of at least one of (C) a fibrous reinforcing agent and (D) an inorganic filler; wherein
the flame retarded composition exhibits a weight loss after 10 minutes at 340° C. of no more than 0.6%.

* * * * *